(12) United States Patent
Ridge et al.

(10) Patent No.: US 7,032,928 B2
(45) Date of Patent: Apr. 25, 2006

(54) VEHICLE FRAME

(75) Inventors: James C. Ridge, Kalamazoo, MI (US);
Scott V. Anderson, Paw Paw, MI (US);
S. Prasad Mangalaramanan,
Kalamazoo, MI (US)

(73) Assignee: Dana Corporation, Toledo, OH (US)

( * ) Notice: Subject to any disclaimer, the term of this patent is extended or adjusted under 35 U.S.C. 154(b) by 103 days.

(21) Appl. No.: 10/271,030

(22) Filed: Oct. 15, 2002

(65) Prior Publication Data

US 2004/0070190 A1    Apr. 15, 2004

(51) Int. Cl.
*B62D 21/17*    (2006.01)

(52) U.S. Cl. .................................... 280/781
(58) Field of Classification Search ............... 280/781, 280/800, 799, 797, 784; 29/897.2; 52/735.1
See application file for complete search history.

(56) References Cited

U.S. PATENT DOCUMENTS

| | | | | |
|---|---|---|---|---|
| 2,052,535 A | | 8/1936 | Sherman | 280/106 |
| 2,145,407 A | * | 1/1939 | Soule | 52/274 |
| 2,189,719 A | * | 2/1940 | Wallace | 280/781 |
| RE24,895 E | | 11/1960 | Clements | 280/34 |
| 3,865,396 A | | 2/1975 | Bates | 280/124 |
| 4,793,113 A | * | 12/1988 | Bodnar | 52/481.1 |
| 5,092,623 A | | 3/1992 | Swanner | 280/638 |
| 5,725,411 A | | 3/1998 | Glynn | 446/128 |
| 6,202,316 B1 | | 3/2001 | Swift et al. | 33/503 |
| 6,286,868 B1 | * | 9/2001 | von Mayenburg | 280/800 |

OTHER PUBLICATIONS

Brochure: Neway "NS190 Slider Trailer Air Suspension Package".
Webpage—www.reycogranning.com—Tuthill Transport Technologies—19AR/RS1062 Air Ride Van Slider.

* cited by examiner

*Primary Examiner*—Paul N. Dickson
*Assistant Examiner*—Joselynn Y. Sliteris
(74) *Attorney, Agent, or Firm*—Dykema Gossett PLLC

(57) ABSTRACT

A lightweight vehicle frame capable of bearing significant loads is provided. The vehicle frame includes first and second rail members extending parallel to one another and at least one cross-member extending between the first and second rail members. At least one of these members includes adjacent apertures in a side wall. One of the apertures is larger in size proximate one edge of the side wall than an opposite edge of the side wall. The other aperture is complementary in shape and is larger in size proximate the opposite edge of the side wall than the one edge of the side wall. The resulting structure reduces the weight of the vehicle frame, yet maintains significant load-bearing capabilities.

16 Claims, 2 Drawing Sheets

VEHICLE FRAME

BACKGROUND OF THE INVENTION

1. Field of the Invention

The present invention relates to a vehicle frame, and more particularly, to a light weight vehicle frame capable of bearing significant loads.

2. Discussion of Related Art

Vehicle frames provide a platform upon which a body can be supported and other components of a vehicle can be mounted. A conventional vehicle frame is commonly referred to as a ladder frame assembly. A ladder frame assembly includes a pair or longitudinally extending side rails that are joined together by a plurality of transversely extending cross-members. The cross-members connect to the two side rails together and provide lateral and torsional stiffness to the ladder frame assembly. Typically, the two side rails are solid pieces of steel and are substantially C-shaped in cross-section. The two side rails open toward one another thereby forming an open channel. The side rails define flanges on the upper and lower edge whereby cross-members can easily be secured inside the channel in any conventional manner, such as by welding or riveting. The side rails and cross-members are typically constructed of solid material, such as steel. These components therefore tend to be quite heavy and add weight to the overall vehicle.

In the truck and heavy vehicle industry, there has been a trend toward limiting the overall weight of the vehicle. Trucks and other large vehicles which are lighter in weight tend to offer better fuel efficiency and are often less expensive to produce and manufacture. As a result, designs of the overall vehicle system have been focused on reducing the weight of various vehicle components. Reducing the weight of a vehicle frame, however, is made difficult because the structural integrity of the vehicle cannot be compromised. As earlier stated, the vehicle frame provides support to the entire vehicle, therefore, the vehicle frame must be strong to withstand undefined loads. U.S. Pat. No. 2,052,535 attempts to meet the above identified objectives and discloses a vehicle frame assembly having a pair of parallel longitudinally extending rails and a plurality of cross-members extending therebetween. The frame rails and cross-members have a plurality of generally circular shaped, oval and/or circular apertures in a side wall. The frame disclosed in U.S. Pat. No. 2,025,535, however, does not sufficiently meet the above-identified objectives of providing a light-weight frame while continuing to provide sufficient structural, load-bearing support to the vehicle.

The inventors herein have recognized a need for a vehicle frame that will minimize and/or eliminate one or more of the above-identified deficiencies.

SUMMARY OF THE INVENTION

The present invention provides a vehicle frame that relatively light in weight, yet relatively strong.

A vehicle frame in accordance with one embodiment of the present invention includes first and second rail members extending parallel to one another and at least one cross-member extending between the first and second rail members. At least one member of the first rail member, the second rail member, and the cross-member includes first and second adjacent apertures in a side wall, the first aperture larger in size proximate one edge of the side wall than an opposite edge of the side wall and the second aperture larger in size proximate the opposite edge of the side wall than the one edge of the side wall. In one embodiment of the invention, the first and second apertures are substantially triangular in shape.

In another embodiment of the invention, the vehicle frame includes first and second longitudinal frame members extending parallel to one another and configured to be received within first and second rail members. The frame further includes at least one cross-member extending between the first and second longitudinal frame members. At least one member of the first longitudinal frame member, the second longitudinal frame member, and the cross-member includes first and second adjacent apertures in a side wall, the first aperture larger in size proximate one edge of said side wall than an opposite edge of the side wall and the second aperture larger in size proximate the opposite edge of the side wall than the one edge of the side wall. Again, in one embodiment of the invention, the first and second apertures are substantially triangular in shape.

A vehicle frame in accordance with the present invention represents a significant improvement as compared to conventional vehicle frames. First, apertures placed in the rails, cross-members and/or longitudinal members provide a light-weight vehicle frame. Second, the structural integrity of the vehicle frame is not compromised in it's ability to support a vehicle body and the vehicle components.

These and other features and objects of this invention will become apparent to one skilled in the art from the following detailed description and the accompanying drawings illustrating features of this invention by way of example.

DETAILED DESCRIPTION OF EMBODIMENTS OF THE INVENTION

Figure 1:
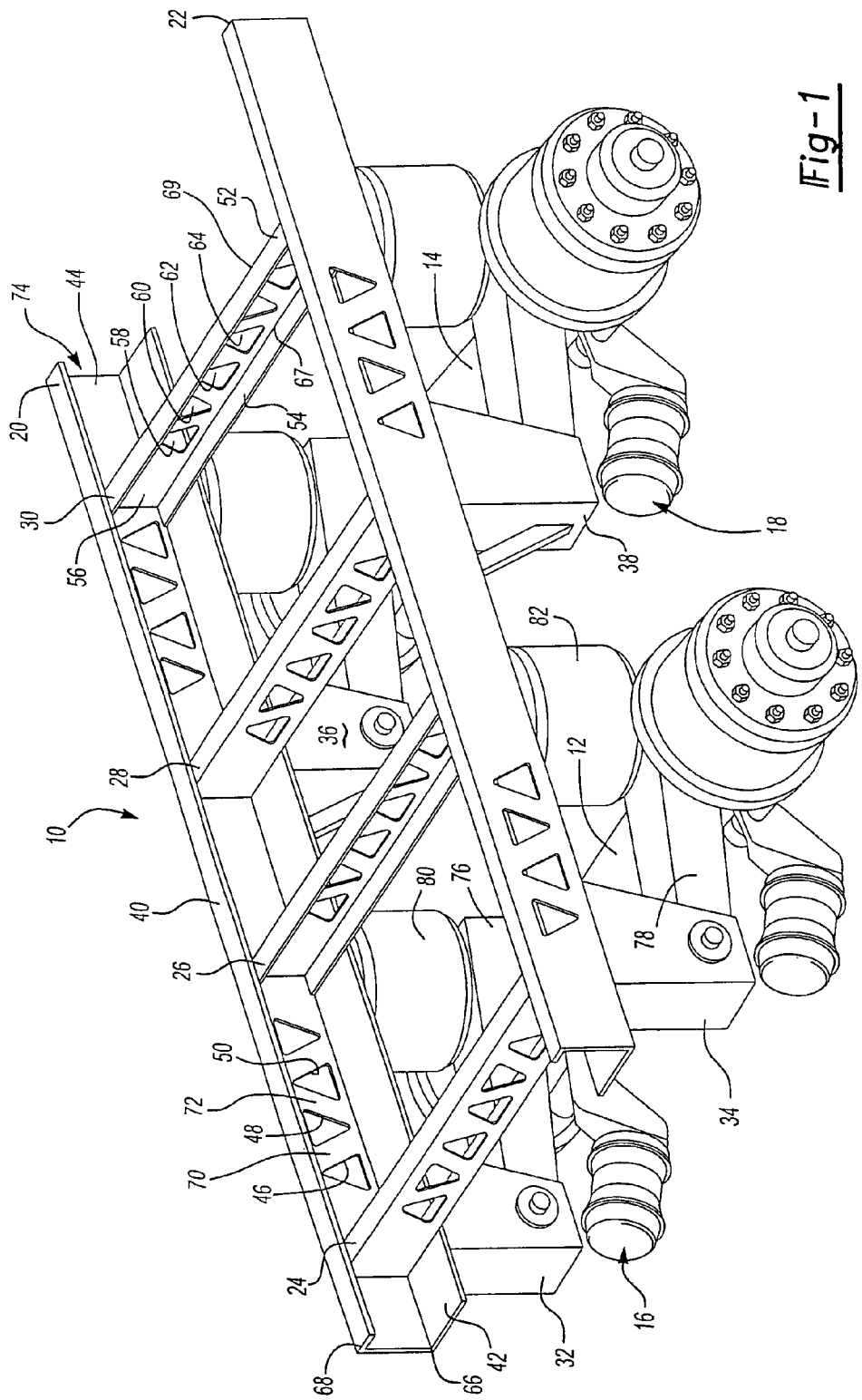
FIG. 1 is perspective view of a portion of a vehicle incorporating a vehicle frame in accordance with one embodiment of the present invention.

Referring now to the drawings wherein like reference numerals are used to identify identical components in the various views, FIG. 1 illustrates a perspective view of a portion of a vehicle including a vehicle frame 10 in accordance with one embodiment of the present invention. Frame 10 is supported on a pair of axles 12, 14 through conventional suspensions 16, 18.

Frame 10 is provided to support various components of the vehicle. In the illustrated and preferred embodiment, frame 10 comprises a trailer frame for use with heavy trucks. It should be understood, however, that the present invention may find use in a variety of vehicle frames and in a variety of vehicles. Frame 10 may include side rail members 20, 22, cross members 24, 26, 28, 30, and brackets 32, 34, 36, 38.

Rail members 20, 22 extend in the longitudinal direction of the vehicle generally parallel to one another. Rails members 20, 22 are generally C-shaped in cross-section and open towards one another in a conventional manner. Each member 20, 22 includes top and bottom walls, 40, 42 and a side wall 44, respectively. Walls 40, 42 may extend transverse to the longitudinal direction of the vehicle (and substantially horizontally relative to earth ground) in an inboard direction while wall 44 extends perpendicular (and substantially vertically relative to earth ground) relative to walls 40, 42. In accordance with the present invention, the side wall 44 of one or both of members 20, 22 may include a plurality of apertures such as apertures 46, 48, 50. As shown in the illustrated embodiment, these apertures may be formed at various intervals along the length of rail members 20, 22. Alternatively, the apertures may extend along the entire length of rail members 20, 22. It should also be understood that, although apertures are illustrated in groups of four apertures in the illustrated embodiment, the number of apertures in any group and among groups may vary without departing from the spirit of the present invention.

Cross-members 24, 26, 28, 30 connect rail members 20, 22. Members 24, 26, 28, 30 extend transversely relative to rail members 20, 22. Members 24, 26, 28, 30 may also be generally C-shaped in cross-section with members 24, 26 and 28, 30 opening towards one another, respectively. Each of members 24, 26, 28, 30 may include top and bottom walls 52, 54 and a side wall 56. Walls 52, 54 extend forward or rearward relative to the direction of vehicle travel (and substantially horizontally relative to earth ground) while wall 56 extends perpendicular to walls 52, 54 (and generally vertically relative to earth ground). Each member 24, 26, 28, 30 may first and second ends configured to be received between top and bottom walls 40, 42 and against side wall 44 of rail members 20, 22, respectively. Members 24, 26, 28, 30 may be welded to members 20, 22. In accordance with the present invention, the side wall 56 of one or more of members 24, 26, 28, 30 may include a plurality of apertures such as apertures 58, 60, 62, 64. As shown in the illustrated embodiment, these apertures may be formed over a central portion of each member 24, 26, 28, 30. It should again be understood, however, that the apertures may extend along the entire length of each of members 24, 26, 28, 30 or be located at varying locations along each member 24, 26, 28, 30 and among members 24, 26, 28, 30.

In accordance with the present invention at least one member of rail members 20, 22 and cross members 24, 26, 28, 30 includes apertures in a side wall 44, 56, respectively, as shown in the illustration. The member includes at least two adjacent apertures which are complementary in shape. In particular, and with reference to rail member 20, aperture 46 is larger in size proximate one edge 66 of wall 44 than an opposite edge 68 of wall 44. Adjacent aperture 48 is larger in size proximate edge 68 of wall 44 than edge 66 of wall 44. Similarly, and with reference to cross member 30, aperture 58 is larger in size proximate one edge 67 of wall 56 than an opposite edge 69 of wall 56. Adjacent aperture 60 is larger in size proximate edge 69 of wall 56 than edge 67 of wall 56. In the illustrated embodiment, apertures 46, 48, 50, and 58, 60, 62, 64 are substantially triangular in shape and form a truss-like structure. Although such a shape is preferable, it should be understood that apertures 46, 48, 50 and 58, 60, 62, 64 may assume other shapes (e.g., trapezoidal) in accordance with the present invention. The present invention represents a significant improvement compared to conventional vehicle frames because apertures 46, 48, 50 and 58, 60, 62, 64 reduce the weight of the vehicle frame but also maintain the structural integrity and load bearing capacity of the frame. In the illustrated embodiment, the forming of apertures 46, 48, 50 and 58, 60, 62, 64 leaves portions, such as portions 70, 72 in member 20, between the apertures that connect edges 66, 68 of the side wall. Portion 70 is nearer one longitudinal end 74 of member 20 at edge 66 than at edge 68. Portion 72 is nearer end 74 of member 20 at edge 68 than at edge 66. Loads are transmitted along portions 70, 72 and the truss-like structure provides significant load-bearing capabilities. The illustrated invention contemplates at least two adjacent apertures that are generally complementary in shape. Referring to cross-member 30, however, adjacent apertures such as apertures 62, 64 may be the same in shape (whereby both apertures are larger in size proximate one edge of the corresponding side wall than an opposite edge) and this may be true for any of members 20, 22 or 24, 26, 28, 30.

Brackets 32, 34, 36, 38 are provided to couple portions of suspensions 16, 18 to frame 10. Brackets 32, 34, 36, 38 are conventional in the art and may be generally C-shaped in cross-section and open rearwardly to receive suspensions 16, 18. Brackets 32, 34, 36, 38 may be welded to rail members 20, 22.

Axles 12, 14 support frame 10 on ground engaging wheels disposed at either end of each axle 12, 14. Axles 12, 14 are conventional in the art and comprise non-driven trailer axles in the illustrated embodiment. Axles 12, 14 extend transverse to the longitudinal direction of the vehicle and frame 10.

Suspensions 16, 18 are provided to dampen movements between axles 12, 14 and frame 10 and are conventional in the art. Referring to suspension 16, each suspension 16, 18 may include a pair of trailing arms 76, 78 pivotally connected at one end in brackets 32, 34 and connected at an opposite end to axle 12. Each suspension may also include springs 80, 82 disposed between axle 12 and/or trailing arms 76, 78 on the one hand and frame 10 on the other hand.

Figure 2:
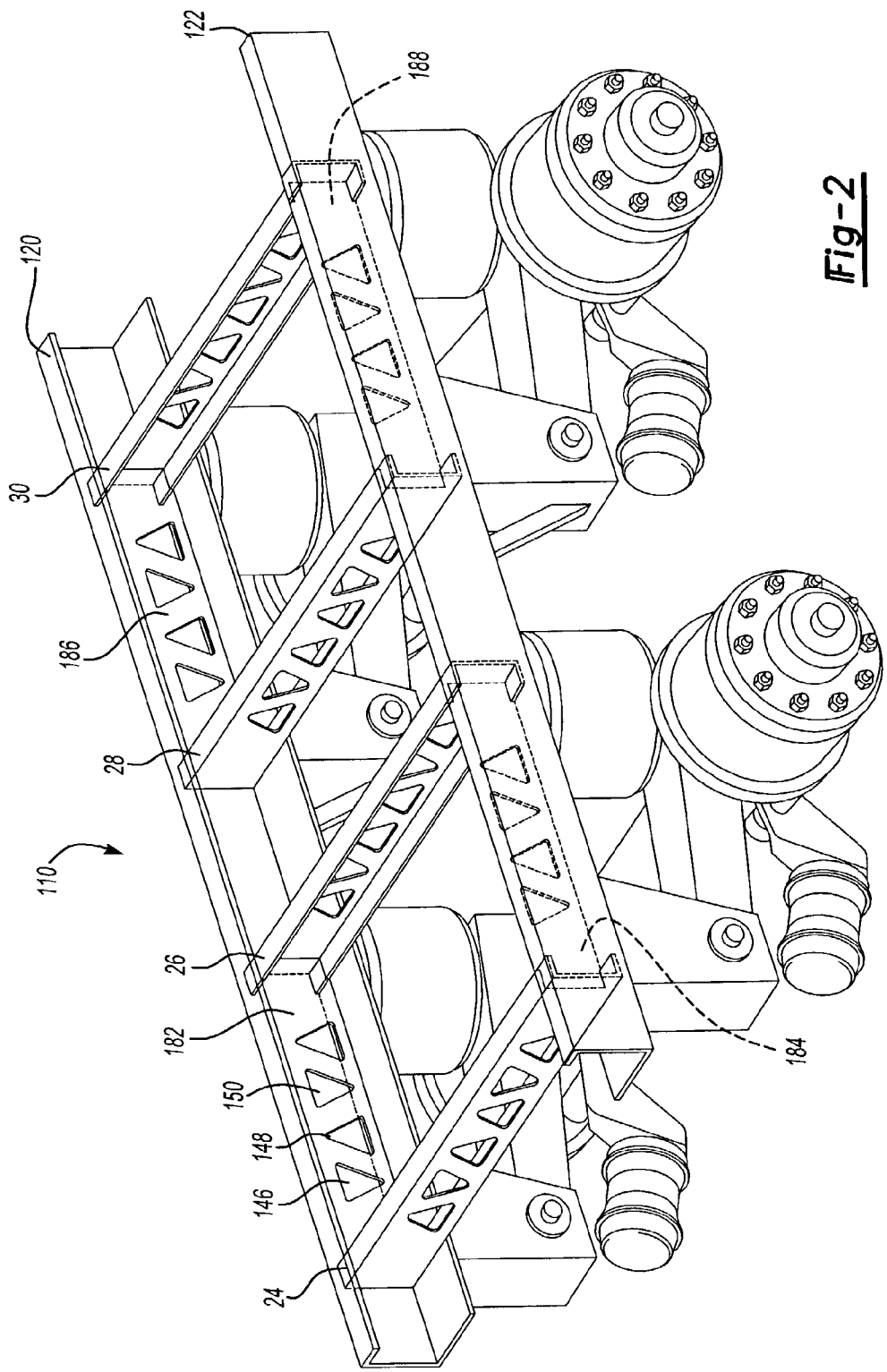
FIG. 2 is a perspective view of a portion of a vehicle incorporation a vehicle frame in accordance with another embodiment of the present invention.

Referring now to FIG. 2, a frame 110 in accordance with a second embodiment of the present invention is illustrated. Frame 110 is substantially similar to frame 10 and like components are designated with the same numbers as in FIG. 1 and reference may be had to the discussion hereinabove with respect to these components. Frame 110 includes longitudinal frame members 182, 184, 186, 188 extending parallel to one another and configured to be received within rail members 120, 122. Rail members 120, 122 are substantially similar to members 20, 22, but do not contain any apertures. Instead, apertures such as apertures 146, 148, 150 are formed within members 182, 184, 186, 188. Members 182, 184 are coupled to cross-members 24, 26 while members 186, 188 are coupled to cross members 28, 30. This coupling may be done through welding or other conventional means and frame subassembly consisting of members 182, 184 and 24, 26 (or 186, 188 and 28, 30) may be positioned within frame members 120, 122.

While the invention has been particularly shown and described with reference to the preferred embodiments thereof, it is well by those skilled in the art that various changes and modifications can be made in the invention without departing from the spirit and scope of the invention.

We claim:

1. A vehicle frame comprising:
   first and second rail members extending parallel to one another; and,
   at least one cross member extending between said first and second rail members
   wherein at least one member of said first rail member, said second rail member, and said cross-member includes first and second adjacent apertures in a side wall, said first aperture larger in size proximate one edge of said side wall than an opposite edge of said side wall and said second aperture larger in size proximate said opposite edge of said side wall than said one edge of said side wall, said at least one of said first rail, said second rail, and said cross-member further including a third aperture adjacent said second aperture, said third aperture larger in size proximate said opposite edge of said side wall than said one edge of said side wall.

2. The vehicle frame of claim 1 wherein said first and second rail members are substantially C-shaped in cross-section.

3. The vehicle frame of claim 1 wherein at least one of said first and second apertures is substantially triangular in shape.

4. The vehicle frame of claim 3 wherein both of said first and second apertures are substantially triangular in shape.

5. A vehicle frame comprising:
first and second longitudinal frame members extending parallel to one another and configured to be received within first and second rail members; and,
at least one cross-member, said first and second longitudinal frame members and said cross member forming a subassembly affixed to said first and second rail members as a unit
wherein at least one member of said first longitudinal frame member, said second longitudinal frame member, and said cross-member includes first and second adjacent apertures in a side wall, said first aperture larger in size proximate one edge of said side wall than an opposite edge of said side wall and said second aperture larger in size proximate said opposite edge of said side wall than said one edge of said side wall.

6. The vehicle frame of claim 5 wherein at least one of said first and second apertures is substantially triangular in shape.

7. The vehicle frame of claim 6 wherein both of said first and second apertures are substantially triangular in shape.

8. The vehicle frame of claim 5 wherein said at least one member includes a third aperture adjacent said second aperture, said third aperture larger in size proximate said one edge of said side wall than said opposite edge of said side wall.

9. The vehicle frame of claim 8 wherein said side wall includes first and second portions connecting said one edge and said opposite edge, said first portion disposed between said first and second apertures and said second portion disposed between said second and third apertures, said first portion nearer one longitudinal end of said at least one member at said one edge than at said opposite edge and said second portion nearer said one longitudinal end of said at least one member at said opposite edge than at said one edge.

10. The vehicle frame of claim 5 wherein said at least one member includes a third aperture adjacent said second aperture, said third aperture larger in size proximate said opposite edge of said side wall than said one edge of said side wall.

11. A vehicle frame comprising:
first and second longitudinal frame members extending parallel to one another and configured to be received within first and second rail members; and,
at least one cross-member, said first and second longitudinal frame members and said cross member forming a subassembly affixed to said first and second rail members as a unit
wherein each of said first longitudinal frame member, said second longitudinal frame member, and said cross-member includes first and second adjacent apertures in a side wall, said first aperture larger in size proximate one edge of said side wall than an opposite edge of said side wall and said second aperture larger in size proximate said opposite edge of said side wall than said one edge of said side wall.

12. The vehicle frame of claim 11 wherein at least one of said first and second apertures in said side wall of one member of said first longitudinal frame member, said second longitudinal frame member, and said cross-member is substantially triangular in shape.

13. The vehicle frame of claim 12 wherein both of said first and second apertures in said side wall of said one member are substantially triangular in shape.

14. The vehicle frame of claim 11 wherein at least one member of said first longitudinal frame member, said second longitudinal frame member, and said cross-member includes a third aperture adjacent said second aperture, said third aperture larger in size proximate said one edge of said side wall than said opposite edge of said side wall.

15. The vehicle frame of claim 14 wherein said side wall for said at least one member includes first and second portions connecting said one edge and said opposite edge of said at least one member, said first portion disposed between said first and second apertures and said second portion disposed between said second and third apertures, said first portion nearer one longitudinal end of said at least one member at said one edge than at said opposite edge and said second portion nearer said one longitudinal end of said at least one member at said opposite edge than at said one edge.

16. The vehicle frame of claim 11 wherein at least one member of said first longitudinal frame member, said second longitudinal frame member, and said cross-member includes a third aperture adjacent said second aperture, said third aperture larger in size proximate said opposite edge of said side wall than said one edge of said side wall.

* * * * *